United States Patent [19]

Schindler et al.

[11] 4,228,193

[45] Oct. 14, 1980

[54] METHOD FOR MAKING SCRAMBLED EGGS

[75] Inventors: James Schindler, Naperville; Anthony R. Nugarus, Chicago, both of Ill.

[73] Assignee: Restaurant Technology, Inc., Oak Brook, Ill.

[21] Appl. No.: 971,311

[22] Filed: Dec. 20, 1978

Related U.S. Application Data

[63] Continuation of Ser. No. 835,644, Sep. 22, 1977, abandoned.

[51] Int. Cl.² .............................................. A23L 1/32
[52] U.S. Cl. ...................................... 426/233; 426/614; 426/510
[58] Field of Search ............... 426/233, 614, 510, 511, 426/523; 99/339, 570

[56] References Cited

U.S. PATENT DOCUMENTS

| | | |
|---|---|---|
| 1,524,623 | 1/1925 | Landrum et al. |
| 2,481,711 | 9/1949 | Bemis ........................... 426/510 |
| 2,766,126 | 10/1956 | Hawk ............................ 426/614 |
| 2,999,024 | 9/1961 | Stimpson et al. ............. 426/614 |
| 3,113,872 | 12/1963 | Jones et al. .................. 426/511 |
| 3,624,230 | 11/1971 | Robinson, Jr. ............... 426/614 |
| 3,958,035 | 5/1976 | Stearns ........................ 426/614 |
| 4,068,570 | 1/1978 | Lanoig ....................... 426/614 X |

*Primary Examiner*—Robert A. Yoncoskie
*Attorney, Agent, or Firm*—Dressler, Goldsmith, Shore, Sutker & Milnamow, Ltd.

[57] ABSTRACT

A method is provided for cooking scrambled eggs wherein a container is provided for holding a charge of uncooked, shelled eggs and is adapted to be matingly and sealingly engaged with a cover assembly around a projecting cylindrical, multi-orificed, steam injection conduit. A plurality of jets of steam and air are injected at spaced locations into the interior of the charge of eggs to agitate and cook the eggs. A disc-like baffle plate is secured to, and concentric with, the injection conduit and is adapted to be received in a free space of the container above the charge of eggs for inhibiting the upward spattering of the eggs during steam injection. A vent passage is provided above the cover plate and communicates with the container during cooking of the eggs via an annular aperture in the cover plate concentric with the steam conduit to allow steam and air to escape from the container during cooking to maintain the interior volume of the container at substantially atmospheric pressure.

27 Claims, 5 Drawing Figures

METHOD FOR MAKING SCRAMBLED EGGS

This is a continuation of application Ser. No. 835,644, filed Sept. 22, 1977, now abandoned.

BACKGROUND OF THE INVENTION

This invention generally relates to a method and apparatus for containerized, high-speed, batch cooking of scrambled eggs. The method and apparatus of the present invention are intended generally for use in restaurants wherein it is desired to cook individual servings of scrambled eggs (consisting of from 1 to 8 eggs) in a very short time and without requiring the cook to continuously stir or manipulate the egg mixture. The method and apparatus of the present invention produces a scrambled egg product that is uniformly and evenly cooked and that is light and fluffy.

The conventional process which has been used for centuries is to scramble and cook small batches of eggs in frying pans or on a grill. There are no commercially available processes for cooking small batches of scrambled eggs that do not rely upon the use of a hot surface which both cooks and tends to partially scorch the eggs.

There have been attempts to produce scrambled eggs on a continuous basis where large quantities are required. For example, U.S. Pat. No. 3,624,230 to Robinson, Jr. discloses a method and apparatus for continuously producing a product which is said to have the appearance and taste of scrambled eggs from a continuously piped slurry. The method disclosed in the Robinson patent is limited for use in a commercial-type, in-plant process with a continuously moving slurry mixture and is not applicable to batch-type cooking of whole, shelled eggs in a container, as in a restaurant.

U.S. Pat. No. 2,999,024 to Stimpson et al. discloses a method of preparing an egg product in the nature of a smooth gelled mass of consistency, color and texture resembling a baked custard which is useful for the feeding of infants and invalids. The method is disclosed as a commercial-type, continuous slurry process in which high pressure steam is introduced into a pipe containing an egg mixture slurry to disintegrate the mixture into a spray-like condition and thereby instantly heat and cook the particles. As in the above-discussed Robinson patent, this method is not applicable to batch-type cooking of small quantities of whole, shelled eggs in a container.

U.S. Pat. No. 2,481,711 to Bemis discloses a method and apparatus for cooking eggs. The method and apparatus provides what may be considered a combination of a fried and poached egg. Steam is introduced to the top surface of the egg within a container to provide a "poached" upper surface while the bottom surface of the egg is fried on a griddle at the bottom of the container. The patent does not disclose a method or apparatus for making scrambled eggs.

The prior art teaches several processes for continuously treating or cooking egg products or egg mixtures with steam. For example, U.S. Pat. No. 3,113,872 to Jones et al. discloses a method for treating shelled eggs to destroy pathogenic bacteria, which method includes a step of admitting steam in sufficient volume to raise the temperature of the egg product to about 150° F. This method is a continuous, "large scale" commercial method. U.S. Pat. No. 2,766,126 to Hawk discloses a method for producing a canned egg yolk puree by means of a continuous, commercial-type process which includes, in one of its steps, heating egg yolk by steam injection to between approximately 140° and 160° F. U.S. Pat. No. 3,958,035 to Stearns et al. discloses a method of manufacturing an omelette-type egg product in which one of the steps includes heating the egg mix by steam injection to a temperature in the range of 160° to 170° F.

In each of these patents, the disclosed method of treating an egg product involves commercial applications on a production line or continuous flow slurry process. None of these patents discloses a method for producing a substantially conventional "scrambled egg" product and none of the patents discloses a method or apparatus for batch-type, containerized cooking of individual servings of an egg product.

None of the above-discussed patents describes a method or apparatus for the high-speed cooking of scrambled eggs in containerized, small batches wherein the eggs are agitated and cooked in a sealed container at substantially atmospheric pressure.

None of the above-discussed patents teach or suggest how to rapidly cook individual servings of scrambled eggs on a batch basis and at substantially atmospheric pressure. It would be desirable to provide a method and apparatus for making scrambled eggs in individual servings or in relatively small quantities for use in restaurants or in the home wherein the scrambled eggs could be rapidly cooked in a batch-type process in a small container and wherein the scrambled eggs could be automatically cooked evenly and uniformly.

It would be desirable to provide a method and apparatus for making scrambled eggs wherein additives such as seasoning or other foods could be introduced into the egg mixture either before cooking or automatically during cooking.

It would be desirable to provide a method for automatically cooking scrambled eggs with steam rapidly and uniformly at pressures of less than 15 pounds per square inch gauge so that the apparatus could be used in the home and in restaurants without falling under the scope of the various state and local regulations covering higher pressure steam devices.

Further, it would be desirable to provide an apparatus and method for cooking scrambled eggs with steam in which the cooking process could be contained within a receptacle sealed from the surrounding atmosphere to prevent the steam, egg product, and any cooking gases from being dispersed into the atmosphere. To this extent, it would also be desirable to provide a vent system for exhausting all such steam and cooking gas vapors from the container or receptacle during the cooking process so that when the receptacle is unsealed at the termination of the cooking process, no large amounts of steam or other gases would be present in the container to escape into the atmosphere.

It would be desirable to provide a method of cooking scrambled eggs which introduces compressed air into the interior of the eggs during cooking to assist in providing a light and fluffy product.

It would be desirable in a method and apparatus for cooking scrambled eggs by steam injection in a container to provide a baffle within the container during the cooking process so that steam could be injected at a pressure sufficient to product violent agitation for thoroughly and uniformly cooking the eggs, with the baffle inhibiting spattering of the egg mix upwardly away from the bottom of the container and thus maintaining the eggs in the lower portion of the container around the steam injection jets so that the mass of egg will be uniformly cooked.

SUMMARY OF THE INVENTION

The present invention provides a novel method for making or cooking scrambled eggs. The eggs are cooked extremely quickly (in as little as about 8 seconds) and in a containerized batch, preferably a batch of between 1 to 8 eggs suitable for 1 or more individual servings. The batch of eggs is thoroughly and uniformly cooked to a substantially homogeneous scrambled egg mass having an expanded volume and which is light and tender and delectable in appearance and flavor.

The method of the present invention contemplates cooking a relatively small number of uncooked shelled eggs in a containerized batch. The uncooked shelled eggs are first placed within a container. They need not be premixed. Subsequently, in the preferred embodiment, a plurality of jets of steam and air are introduced into the interior of the batch of eggs at spaced, stationary locations so that the steam is dispersed throughout the batch of eggs thereby agitating and cooking the eggs. Simultaneously with the introduction of the jets of steam and air, the container is continuously vented to allow escape of steam, air, and other gases that may be generated from cooking, so as to maintain the interior volume of the container at substantially atmospheric pressure. The process can be automatically terminated in response to a predetermined condition (e.g., elapsed time interval, egg temperature, or totalized steam flow) after the batch of eggs is thoroughly and uniformly cooked.

Although the use of jets of steam or jets or air and steam for the batch preparation of scrambled eggs has not previously been used, steam has been used in other environments for cooking foods, and steam nozzles have been used to introduce steam into food holding containers or the like. Typical of prior devices of that type are those shown in U.S. Pat. Nos. 218,497; 1,461,653; 1,522,794; 1,524,623; 2,967,773; and 3,790,931.

In the method of the present invention the jets of steam and air are preferably introduced in about the geometric center line of the batch of eggs and the jets of steam and air are directed outwardly throughout the egg mixture. Preferably, the container is sized to provide a free space for expansion of the batch of eggs upwardly as their volume increases during cooking and because of the introduction of steam and entrainment of air. A baffle means or plate is introduced into the free expansion space in the container above the batch of eggs to prevent the eggs from spattering upwardly an undue amount and to contain the eggs in the lower portion of the container in about the region in which the plurality of jets of steam and air are being introduced.

The apparatus for cooking scrambled eggs in accordance with the method of the present invention preferably comprises a support housing containing a compressed air supply system, such as a compressor and compressed air receiving tank, a steam generator such as a steam boiler, a condenser, an injection conduit and an open-mouthed, cup-shaped container for holding a batch of shelled eggs. The injection conduit is a generally hollow, cylindrical tube projecting downwardly from a portion of the support housing. A cover assembly is supported from the housing and presents a downwardly facing cover surface for sealingly interlocking the mouth of the container and holding the container upright around the injection tube during cooking of the batch of eggs. The cylindrical tube has a plurality of orifices for discharging a plurality of jets of steam and air and is adapted to be received within the container for discharging the jets into the interior of the batch of eggs to disperse the steam and air therein whereby the batch of eggs is agitated and cooked. Preferably, the interior shape of the container and tube orifices are proportioned and located to enhance reflection of the steam and air back through the egg mixture to enhance complete cooking.

A generally disc-shaped baffle plate is preferably secured to the injection tube above the plurality of orifices in generally concentric, coaxial alignment with the tube. When the container is engaged with the cover assembly with the tube projecting therein, the baffle plate lies within the upper portion of the container generally parallel to, and below, the cover surface to prevent upward spattering of the egg mixture and to maintain the egg mixture generally in the lower portion of the container about the steam and air injection orifices.

Preferably, the cover assembly has an annular aperture extending from the underside, or downwardly facing sealing cover surface in communication with the interior of the container for allowing the steam, air, and other gases to vent from the container during cooking through that aperture. Preferably, the vent aperture is connected to the condenser so that the vented steam may be condensed. The venting system maintains the container substantially at atmospheric pressure during and after cooking.

Steam supply lines and air supply lines are provided between the boiler and air receiver, respectively, and appropriate control valves and control systems are provided for admitting air and steam into the injection tube and for terminating the injection of steam and air in response to a predetermined condition (e.g., elapsed time interval, egg temperature, or totalized flow of steam and/or air) after the batch of eggs is thoroughly cooked.

The method of the present invention when effected by the apparatus of the present invention, is completely automatic and requires no operator manipulation of the eggs during cooking. As a result, the scrambled egg product can be repeatedly made in individual batches of substantially identical and consistent density, texture, flavor, and quality.

The method and apparatus of the present invention produce a scrambled egg product without the use of a heated griddle or cooking surface, such as a frying pan, which is commonly used in preparation of scrambled eggs. Cooking of scrambled eggs on a grill, griddle, or in a frying pan requires that an egg mixture be made by mixing eggs and that the mixture be placed on a heated surface so that at any one time, part of the egg mixture is in contact with the heating surface and the remaining portion of the egg mixture lies above the heating surface and not in direct contact therewith. This leads to non-uniform cooking of the egg mixture and requires constant operator activity with respect to stirring the egg mixture on the heated surface. Depending upon the skill and care of the operator, the egg product will have portions which are more or less cooked than other portions of the egg product. Typically, some portions of the scrambled egg product are "overcooked", some portions are "undercooked", while other portions may be "just right".

It is believed that scrambled eggs cooked according to the method of the present invention, being constantly agitated, uniformly heated, and not in contact with heated grill surfaces, become so uniformly cooked that all portions of the scrambled egg product are cooked to the same and proper degree such that very little, if any, of the scrambled egg product is either overcooked or undercooked. Therefore, a scrambled egg product properly cooked in accordance with the method of the present invention will have very few overcooked or undercooked parts and will therefore be more uniform in quality and consistency and more properly digestible.

Numerous other advantages and features of the present invention will become readily apparent from the following detailed description of the invention and of one embodiment thereof, from the claims and from the accompanying drawings.

BRIEF DESCRIPTION OF THE DRAWINGS

In the accompanying drawings forming part of the specification, and in which like numerals are employed to designate like parts throughout the same.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

The precise shapes and sizes of the components herein described are not essential to the invention unless otherwise indicated, since the invention is described with only reference to an embodiment which is simple and straightforward.

It will be understood that the references made herein, and in the claims, to various terms such as "vapor" and "gas", that the same are merely illustrative. The terms "vapor" and "gas" are used herein in a non-technical sense, and are intended to include finely dispersed liquids in an air or other gas stream, true vapors, true gases, and the like, without regard to the critical temperatures or pressures thereof, or the like.

For ease of description, the apparatus of this invention will be described in normal operating position, and terms such as upper, lower, horizontal, etc., will be used with reference to this normal operating position. It will be understood, however, that apparatus of this invention may be manufactured, stored, transported and sold in orientation other than the normal operation position described.

The apparatus of this invention has certain conventional boiler systems, condenser systems, gas compressor systems, electronically and pneumatically actuated valves, and control mechanisms and systems, the details of which, though not fully illustrated or described, will be apparent to those having skill in the art and an understanding of the necessary functions of such components and systems.

The method of cooking scrambled eggs according to the present invention will first be described in general terms. Following the general description of the method, a preferred embodiment of an apparatus for effecting the method of the present invention will be described in detail. In connection with the description of the preferred embodiment of the apparatus, certain details of the method of cooking scrambled eggs according to the present invention, as well as alternative steps in the method of the present invention, will be discussed.

In general, a relatively small number of eggs, such as a batch of from one to eight shelled uncooked eggs, can be cooked and scrambled according to the method of the present invention in a batch-type process in a relatively short time, essentially automatically and without requiring operator action during cooking. Specifically, a batch of shelled, uncooked eggs is first placed within a container. Additional ingredients, such as butter, cream, salt, and pepper may also be added. The eggs and ingredients need not be mixed. Steam is then injected into the interior of the batch of eggs in the container to agitate and cook the eggs.

Preferably, a steam injection conduit having a plurality of injection orifices for discharging jets of steam is provided. When that is the case, the conduit is juxtaposed with the container so that the portion of the conduit with the steam injection orifices is submerged within the interior of the batch of eggs. This may be effected as by moving the container relative to the conduit, or by moving the conduit relative to the container. Ideally, the conduit is placed approximately at the geometric center line of the batch of eggs so that when the jets of steam are directed outwardly of the orifices through the interior of the batch of eggs the steam is dispersed therein. Preferably, compressed air is also injected through the same, or different, orifices along with the steam to aid in agitating the egg mixture and to provide aeration of the mixture which results in a fluffier product.

While the jets of steam and air are being injected into the batch of eggs, the container is sealingly engaged adjacent its top with a cover to prevent the steam, air, and any resulting cooking gases from being released directly to the surrounding atmosphere. Also, while the jets of steam and air are being injected into the batch of eggs, the container is continuously vented, preferably to a remotely located condenser, to allow escape of steam and air from the container to maintain the interior volume of the container at substantially atmospheric pressure. Finally, the injection of the jets of steam and air is terminated in response to a predetermined condition, such as in response to an elapsed time interval, temperature, or totalized, steam flow or the like, after the batch of eggs is thoroughly and uniformly cooked to a substantially homogenous scrambled egg mass having an expanded volume and which is light and tender and delectable in appearance and flavor.

The preferred pressures, temperatures, and flow rates of the steam and air depend on, among other things, the shape and size of the container and injection means or tube. Consequently, the values for these parameters will be discussed with reference to the specific embodiment of the apparatus for effecting the method of the present invention which will next be described.

Figures 1, 2:
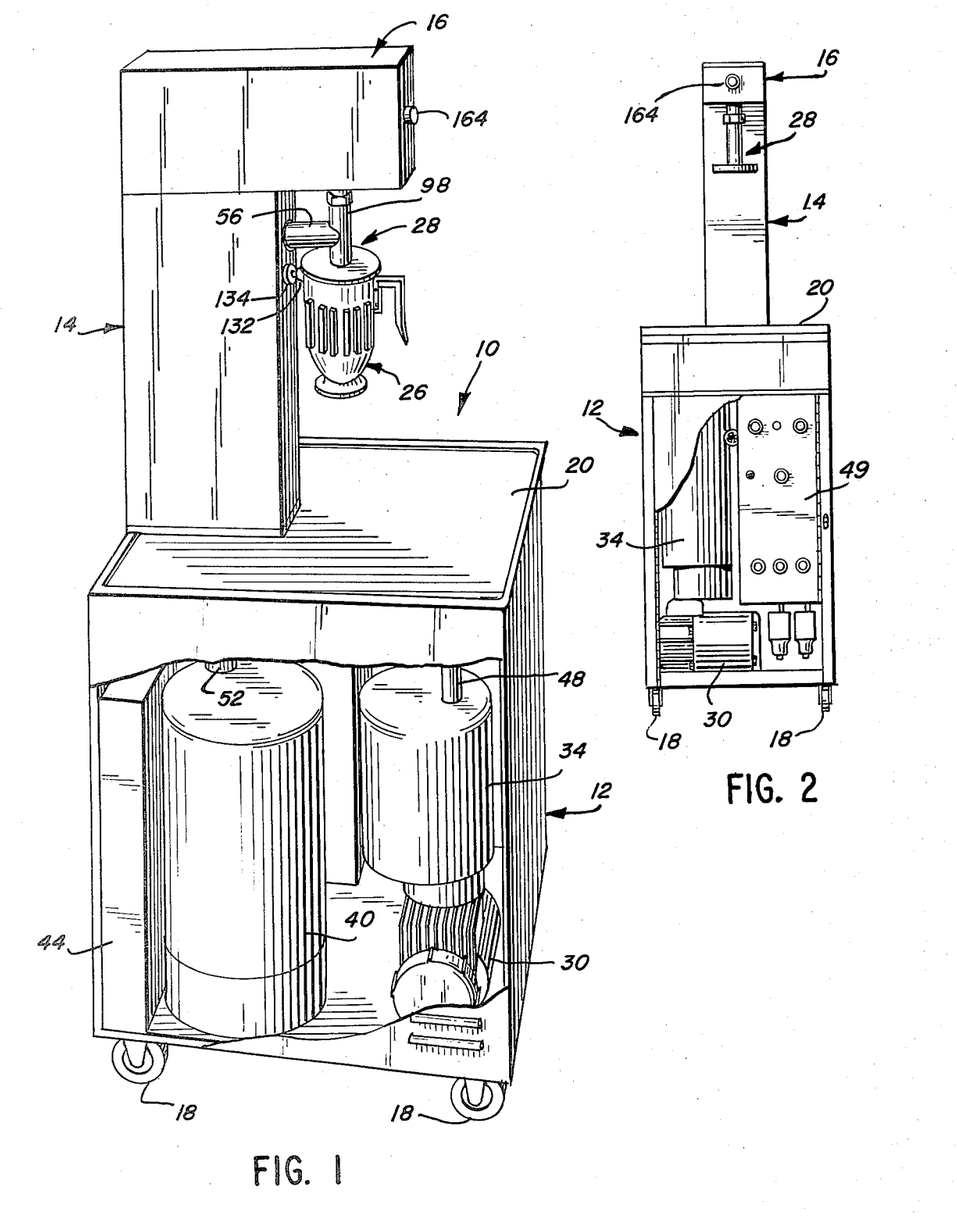
FIG. 1 is a perspective view of the apparatus of the present invention with a portion of the housing wall cut away to show internal components.
FIG. 2 is a front elevation view of the apparatus of the present invention with a portion of the housing wall cut away to show internal components.

With reference to FIG. 1, there is illustrated a scrambled egg cooking apparatus of the present invention which is designated generally by the numeral 10. The apparatus 10 is preferably a self-contained, compact, mobile unit providing a support frame assembly and comprising a lower housing 12, a conduit housing 14 above the lower housing 12, and a control valve housing 16 cantilevered from the conduit housing 14. The housings preferably have stainless steel walls with generally smooth surfaces free of apertures or other irregularities to permit rapid and effective cleaning of the unit concomitant with normal sanitary practices associated with food processing equipment. Mobility of the apparatus 10 is accommodated by wheels 18 depending from the bottom of the lower housing 12. The lower housing 12 has a top working surface 20 which may function to hold food items and other implements before, during, and after cooking of the scrambled eggs.

The eggs are cooked in a container 26 which may be releasably engaged with a holding means or cover assembly 28. The cover assembly 28 projects downwardly from the underside of the control valve housing 16 and has within it a steam injection conduit and steam vent passage, the details of which will be described hereinafter.

As best illustrated in FIG. 1, the lower housing 12 serves to contain and support three relatively large components. An air compressor 30 is mounted on the lower floor of housing 12 and an air receiver tank 34 is connected to the air compressor output 30 and is mounted thereabove. For cooking a relatively small number of eggs, it has been found in an actual working embodiment of the apparatus of the present invention that an air compressor of about ¼ horsepower will provide sufficient air flow when coupled with an air receiving tank of sufficient capacity and design to hold compressed air between 15 and 30 psi gauge.

Steam is supplied to the batch of eggs from a steam generator 40 mounted within the housing 12. It has been found that in an actual working embodiment of the apparatus of the present invention that a non-recirculating boiler can be used. The boiler can be refilled with water after a certain number of cooking cycles (e.g., at the end of a day in a restaurant) To this end, for an operation intended to make 150 batches of scrambled eggs per day (each batch comprising between one and eight eggs), the boiler should be designed to supply the steam at 10 to 12 psi gauge and at a rate of about 2 fluid ounces of water per cooking cycle (or 2 ounces of water by weight per cooking cycle). For best results, if saturated steam is used, it is desirable to prevent carry-over of moisture in the steam and to this extent appropriate steam dryer baffles may be employed.

As will be explained in detail hereinafter, the container 26 is vented during cooking to maintain the interior volume of the container substantially at atmospheric pressure. To avoid exhausting steam, air, and any resulting cooking gases directly into the ambient atmosphere at objectionable temperatures and pressures, a condenser 44 is preferably provided within the lower housing 12 to receive the steam, air, and cooking gases through a vent conduit in which the steam cools and begins to condense. The condenser may simply be a finned plate against which the steam, air and gases are directed and which, at the temperatures and pressures involved, sufficiently condenses steam to avoid excessive escape of steam into the ambient atmosphere.

The actual design and construction of the air compressor 30, air receiver tank 34, steam generator 40, and condenser 44 may be of any suitable conventional types, the specific configurations, sizes, and designs being varied as necessary to accommodate the pressures, temperatures, and flow rates of the steam and air used to cook the scrambled eggs in accordance with the method of the present invention.

An appropriate control panel 49 (FIG. 2) may be provided within the lower housing 12 to provide individual control over the various major components such as the compressor 30, steam generator 40, and other components such as power-actuated valves.

The air receiver tank 34, the steam generator 40, and the condenser 44 all communicate with the container 26 through conduit 98 in the cover assembly 28 via suitable pipes or conduits which pass from the lower housing 12, up the conduit housing 14, and through the control valve housing 16. In FIG. 1, the air supply conduit 48 is shown connected to the top of the air receiver tank 34 and the steam supply conduit 52 is shown connected to the top of the steam generator 40. A vent conduit 56 is connected to the cover assembly 28 and enters the side of the conduit housing 14. From there it passes to the lower housing 12 where it is connected to the condenser 44 (the connection at the condenser 44 is hidden from view in FIG. 1).

Of course, suitable conventional pressure relief mechanisms and vents (not illustrated) may be provided on the air compressor 30, the air receiver tank 34, the steam generator 40, and the condenser 44 in accordance with normal design practice for these types of components in the application to which they are adapted, but such safety devices will not be further discussed herein.

Figures 3, 4:
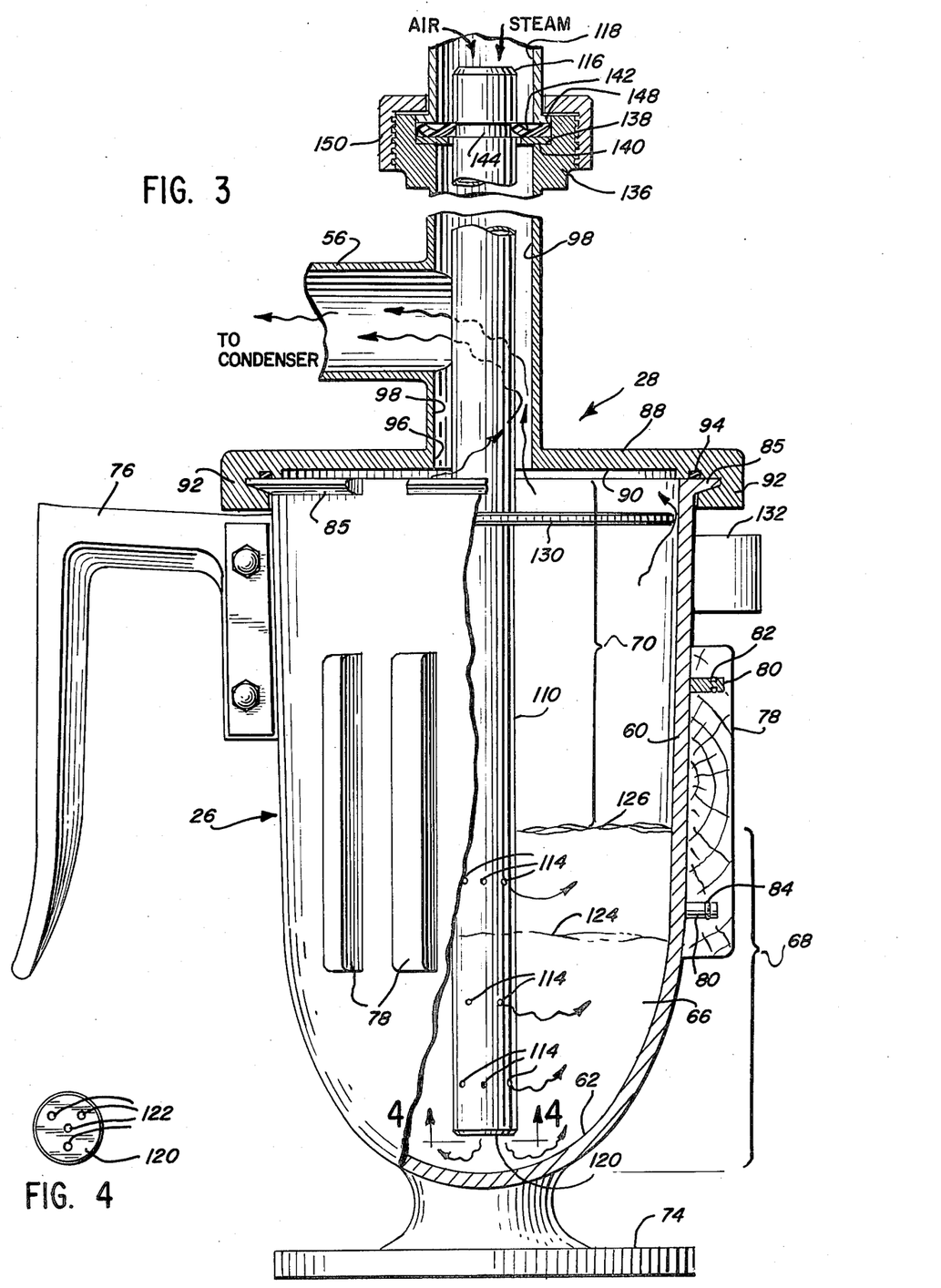
FIG. 3 is an enlarged, fragmentary, partial cross-sectional view of the container and steam/air injection tube assembly of the present invention.
FIG. 4 is an end view of the injection tube taken generally along the plane 4—4 of FIG. 3.

The cover assembly 28, the container 26, and the steam supply, air supply, and vent conduit connections to the cover assembly 28 will now be described in more detail. FIG. 3 illustrates an enlarged view of the container 26 sealingly engaged with the cover assembly 28. The container 26 is generally cup-shaped and open-mouthed and has a substantially upstanding vertical, cylindrical wall portion 60 extending above a generally concave rounded bottom portion 62. The batch of eggs or mixture of eggs plus other ingredients 66, is placed in the container 26 and occupies a lower holding portion, indicated by the bracket 68 in the container 26. The upstanding sidewall or cylindrical wall portion 60 of the container 26 extends a sufficient distance above both the bottom portion 62 and lower holding portion 68 to provide a free space, indicated by the bracket 70, for expansion of the batch of eggs during cooking.

The container 26 is preferably made of stainless steel and has a smooth interior surface which may be coated with a synthetic resin polymer, such as Teflon, to prevent sticking of the scrambled eggs thereto. The exterior portion of the bottom of the container may be formed into a base or pedestal 74 to allow the container 26 to be supported in the upright vertical orientation when disconnected from the cover assembly 28 and placed on a flat surface, such as the working surface 20 on the top of the lower housing 12. A handle 76 may be secured to the container 26 by suitable means, or may be integral therewith, to provide a means by which the container 26 may be manipulated by the operator. Additionally, a plurality of insulating members 78 may be secured to the exterior of the container 26 to provide a cool gripping surface should the operator choose to grasp the cylindrical sidewall portion 60 of the container 26 rather than the handle 76. The insulating members may be of a material which has relatively poor heat conduction properties, such as wood, and they may be secured to studs 80 welded to the outside of the container sidewall 60. The studs 80 may have an annular groove 82 for receiving a suitable adhesive 84 which secures the insulatng members 78 to the studs 80.

For cooking between 1 and 8 eggs, it has been found that a container with an interior height of between 4 and 8 inches, preferably about 6½ inches, and having a maximum inside diameter at the mouth of between 3 and 5 inches, preferably about 3⅝ inches, will yield excellent results with the steam injection tube having a design that will be described hereinafter and with the steam and air flow parameters having values that will be hereinafter discussed. Preferably, the rounded bottom 62 of the container has an inside radius of about 3 inches. It has been found that when stainless steel is used as a container material, a wall thickness of about 0.06 inch is sufficient to provide the requisite structural integrity and an overall heat sink capacity which, when combined with the preferred steam and air flow rates and temperatures, yields an excellent scrambled egg product.

The container 26 is adapted for sealingly engaging, and being held by, the cover assembly 28. To this end, the top of the container terminates in bayonet-type lugs 85 for interlocking with the cover assembly 28. The cover assembly 28 has a generally disc-shaped cover 88 which presents a downwardly facing cover surface 90 for sealingly engaging and interlocking the mouth of the container 26 and for holding the container upright during cooking of the batch of eggs. To this end, a flange 92 is provided at the periphery of the cover surface 90 for matingly engaging the bayonet lugs 85 of the container.

The bayonet-type engagement between the container 26 and the cover 88 is of the conventional type wherein rotation of the container relative to the cover 88 for a certain number of degrees will bring the container lugs 85 into alignment with simularly shaped and identically sized apertures in the cover flange 92 whereby the container 26 is free to drop vertically downwardly and out of engagement with the cover assembly 28. Obviously, other types of interlocking and sealing connections may be employed to effect the same result. A sealing ring 94, preferably one made from an elastomeric material and having a generally square-shaped cross section, may be provided in the flange 92 to assure liquid tight sealing against the top of the bayonet flange 85 of the container 26.

An aperture 96 is provided in the center of the cover 88 and communicates with a vent chamber 98. The steam, air, and cooking gases may be exhausted through aperture 96 from the inside of the container 26 into the vent chamber 98. The previously discussed vent conduit 56 is connected to the vent chamber 98 and conducts the steam, air, and other gases from the vent chamber 98 to the condenser 44 as previously described.

To provide for safe operation, an interlock is provided to prevent the steam and/or air from being supplied to the injection tube 110 whenever the container is not sealingly engaged with the cover assembly 28. To this end, a lug 132 is provided on the exterior of container 26 to engage a limit switch 134 on the front of the conduit housing 14 when the container 26 is properly sealingly engaged with the cover assembly 28 as illustrated best in FIG. 1. The limit switch 134 is interlocked with the control system for the steam and air supply as will be described hereinafter, to prevent steam and air from being injected when the container 26 is not properly sealingly engaged with the cover assembly 28.

Located partially within, and projecting downwardly from the cover assembly 28 is a means 110 for injecting steam and/or air into the interior of the batch of eggs within the container 26. This means 110 is preferably a generally cylindrical conduit or tube having a plurality of discharge orifices 114 in the cylindrical wall. The conduit or tube 110 is in communication at a first end, 116, with a line or conduit 118 which supplies air and steam. The injection conduit 110 has a second end which includes a generally flat, disc-like closure member 120 defining a plurality of orifices 122 as best illustrated in FIG. 4.

For the size and shape of the container 26 previously described, it has been found that a good scrambled egg product is produced when the orifices 114 are located in three vertically spaced-apart circumferential rows about the conduit 110. Preferably, the orifices in each row are located at 60° increments around the tube. The orifices in the middle row are displaced in one direction 20° circumferentially from the orifices in the bottom row and the orifices in the top row are displaced in the same direction 20° circumferentially from the orifices in the middle row. That is, each orifice in the middle row is located on a line 20° from a parallel line passing through an orifice of the upper row and 20° from another parallel line passing through an orifice in the bottom row.

Preferably, each orifice is circular and has a diameter of about 1/16 inch and the conduit or tube 110 has an outside diameter of 0.675 inch. For use with a container of the size and shape previously described, it has been found that a good scrambled egg product is obtained when the conduit or tube 110 extends to within a distance of between about 0.06 inch and 1.0 inch above the bottom portion 62 of the container 26. Each orifice 114 in the cylindrical wall of the tube or conduit 110 is illustrated as being aligned about an axis which is perpendicular to, and radiates out from, the central longitudinal axis of the tube. If desired, the orifices 114 may be angled, as downwardly at about 15°, within the wall of tube 110.

The orientation and direction of the orifices with respect to the concave interior cup surface which may be partispherical or parabolic in shape are such that the steam and/or gas jets will be redirected or reflected by the cup surface back through the egg mass to maximize their agitating and cooking effect. This produces a more completely cooked product.

The number of orifices, the number of rows of orifices, and the array or configuration of the orifices on the tube may be varied. For a given batch of eggs, it is not essential that all orifices be disposed within the egg mixture. In FIG. 3, the dashed and solid lines 124 and 126, respectively, illustrate the relative surface heights of mixture of two and four eggs. In the case of two eggs, the top row of orifices 114 is not submerged within the egg mixture 66 whereas with four eggs, the top row is submerged.

A baffle means or baffle plate 130 may be provided within the container 26 in the expansion free space 70 to prevent the egg mixture from spattering upwardly beyond a certain height and to thereby maintain the egg mixture in the lower portion of the container surrounding the orifices 114 and 122. Further, the baffle plate 130 prevents the egg mixture from spattering upwardly against inner cover surface 90 and out through the aperture 96 into the vent chamber 98. Baffle plate 130 may be a substantially flat disc secured to the discharge tube 110 above the top row of orifices 114 which is in generally coaxial alignment with the cylindrical discharge tube 110 end wall 120 by an amount sufficient to locate the baffle plate 130 within the container free space 70 above the batch of eggs 66 and with the baffle plate 130 generally parallel to the surface of the batch of eggs 66.

Both the conduit 110 and the baffle plate 130 are preferably coated with a synthetic resin polymer, such as Teflon, to prevent the eggs from sticking thereto.

To accommodate rapid disassembly and cleaning of the injection tube 110 and cover assembly 28, the injection tube 110 is uniquely mounted within the cover assembly 28. The cover assembly 28 includes the previously discussed vent chamber 98. To accommodate the conduit or injection tube 110 and provide vent capacity within the chamber 98, the chamber 98 has a generally cylindrical wall spaced away from the tube 98. An upwardly extending portion of the vent chamber 98 terminates in a flange 136 having an annular shoulder 138 on the interior thereof. A washer 140 is disposed on the shoulder 138 and supports a generally annular member or gasket 142 having a generally V-shaped cross-section. The gasket 142 is made of resilient material, such as rubber, and is adapted to engage an annular groove 144 in the injection tube 110 near end 116. The conduit 118 has an annular flange 148 which rests on a portion of the upper surface of the gasket 142. The conduit 118, the gasket 142, the washer 140, and the flange 136 are all secured together in this arrangement by bushing 150 which is threadingly engaged with the exterior of the flange 136. The weight of the discharge tube 110 is borne along the groove 144 by the inner diametrical surfaces of the annular gasket 142. Gasket 142 prevents air and steam from passing from conduit 118 along the outside of injection tube 110 into the vent chamber 98. Thus, air and steam within the conduit 118 must flow on the inside of the injection tube 110 and out through the orifices 114 and 122 into the batch of eggs 66.

When it is desired to remove and clean the injection tube 110, the injection tube 110 need merely be pulled downwardly. Owing to the flexibility of the gasket 142, the tube 110 becomes disengaged therefrom and can be fully withdrawn from the cover assembly 28. If it is desired to remove the cover assembly 28 also, the bushing 150 can be disengaged from the flange 136 and a connection in the vent conduit 56 (not shown) can be similarly released, thereby allowing the cover assembly 28 to be removed from the machine.

Figure 5:
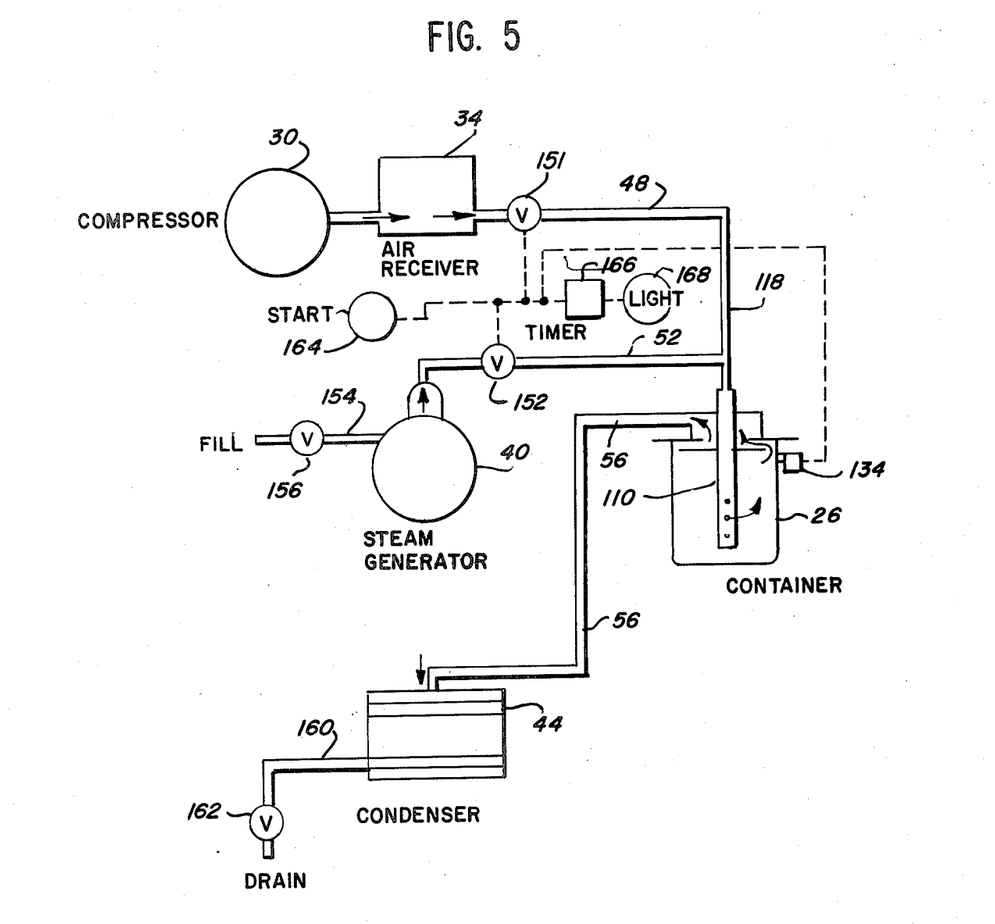
FIG. 5 is a simplified control diagram for the apparatus of the present invention.

The operation of the apparatus 10 will next be described with reference to the block diagram illustrated in FIG. 5. The compressor 30 is coupled to the air receiver 34 for supplying the steam/air mixing conduit 118 and the injection tube 110 with pressurized air through conduit 48. A remotely actuated valve 151, such as an electric solenoid operated valve is provided in conduit 48 to admit or terminate the flow of air through the conduit 48. Steam generator 40 is connected via conduit 52 to the steam/air mixing conduit 118 and the injection tube 110. A remotely actuated valve 152, such as an electric solenoid operated valve, is provided in conduit 52 to admit or terminate the flow of steam through the conduit. A fill line 154 and fill valve 156 is provided to allow replenishment of the water supply in the steam generator. The container 26 is vented through conduit 56 to moisture trap or condenser 44 which may be periodically drained through drain lines 160 by the opening of drain valve 162.

Preferably, steam and air are admitted to the container 26 by an initiating signal, for example, by the operator pushing a button 164 (FIGS. 1 and 2), and the steam and air then flow into the container 26 to cook the eggs. After cooking, the flow of steam and air is terminated in response to a predetermined condition. The predetermined condition may be a sensed batch temperature, a totalized flow of steam and/or air, or a predetermined time interval during which the steam and/or air is injected. In the embodiment illustrated in FIG. 5, the flow of steam and air is controlled by valves 152 and 150 which can be opened by actuation of a momentary contact push button 164 and which are subsequently closed by a time delay relay or by one or more timers in the circuit, such as timer 166.

Valves 150 and 152 are interlocked with the previously described limit switch 134 to prevent their being opened, or if open, to close them when the container 26 is not properly sealingly engaged with the cover assembly 28. This prevents discharge of steam and air when the container is not in place for cooking.

A light, such as light or lamp 168, may be provided in the control system to indicate, upon its being energized, that the cooking cycle is completed. It may be desirable to provide a time delay, say for example a 10-second time delay, after the termination of the steam injection before the light 168 is energized to insure that all steam and any resulting cooking gases have been vented to the condenser.

As has previously been described, various components of the apparatus of the present invention, such as the injection tube 110, the baffle plate 130, and the container 26 may be coated with a material, such as Teflon, to prevent the scrambled eggs from sticking to the surfaces of the component. The use of such coatings should be carefully considered to insure that they do not chemically react or break down to produce undesirable or even poisonous by-products at the temperatures encountered during cooking of the scrambled eggs in accordance with the method of the present invention.

In the preferred embodiment of the method of cooking scrambled eggs according to the present invention, the above described apparatus is used to inject steam from 6 to 14 pounds per square inch gauge, preferably between 11 to 12 pounds per square inch gauge, at a saturation temperature corresponding to the pressure. The steam is injected for a period of between 6 to 12 seconds, preferably for about 8 seconds. The steam is injected at a substantially constant rate of flow corresponding to a rate of about two ounces of water by weight over the duration of the 8 second steam injection period.

The air is preferably injected for a period of between 3 and 7 seconds, preferably about 5 seconds, with the air injection period commencing with the commencement of the steam injection period. The air is supplied to the air injection tube 110 at a pressure of between 5 and 15 pounds per square inch gauge, preferably at about 10 pounds per square inch gauge. The rate of flow of air into the container is preferably substantially constant over the injection period and corresponds to a flow rate of between 0.134 and 0.669 cubic feet of air, measured at standard temperature and pressure, over the duration of the air injection period. Preferably, the rate is equivalent to about 0.334 or 0.401 cubic feet of air, measured at standard temperature and pressure, over the duration of the air injection period.

The cycle cooking time, that is the preferred steam injection time of 8 seconds and the air injection time of 5 seconds, is substantially independent of the number of eggs for a relatively small number of eggs being cooked. Specifically, when executing the method of the present invention within the above-discussed preferred parameters, the cooking times for batches of eggs comprising anywhere from 1 to 8 eggs are essentially the same. However, as the number of eggs increases, it may be desirable to increase the dimensions of the cup and/or steam injection to accommodate the increased mass.

It has been found that when the steam and air is injected for the time period described above, the interior temperature of the scrambled egg mass raised to between about 190° and 200° F. at the termination of the cooking cycle.

Though the preferred embodiment of the method and apparatus of the present invention has been described with reference to the use of steam and air, scrambled eggs can be effectively made in accordance with the present invention by the use of steam alone or by the use of steam with other gases. Such other gases may be inert gases, preferably carbon dioxide or nitrogen. In any case, such other gases should be purified or filtered by suitable means.

It is also possible that the steam and/or air may be injected intermittently. That is, the jets of steam and/or air may be injected for an interval of a predetermined length of time and then terminated for another interval of a predetermined length of time and then again injected for an interval of a predetermined length of time and so on until the desired degree of agitation and cooking has been achieved.

Though the preferred embodiment is described as using an injection tube 110 having orifices 114 through which a mixture of steam and air pass, it may be desirable, in some instances, to provide an injection tube having separate orifices connected to a steam supply and another set of separate orifices connected to another gas supply (such as air). Alternatively, a plurality of separate tubes may be inserted into the egg mixture. In that case, one of the tubes may inject steam and another of the tubes may inject another gas such as air. Alternatively, all of the tubes may inject a mixture of the steam and other gas. Preferably, the orifices 114 are circular. With a circular orifice, the jet of steam or air will issue therefrom in a generally conical flow stream for better dispersion throughout the egg mixture. However, orifices having other shapes may be used.

It is possible with the method and apparatus of the present invention to add other food items or ingredients to the scrambled egg mixture. This can be done either before the egg mixture is cooked or during the cooking. For example, it is preferred to cook two scrambled eggs as follows:

(1) Two medium size eggs are first broken and placed without their shells into the bottom of the container (the eggs need not be mixed before cooking);

(2) One half tablespoon of milk or cream is added to the container;

(3) One pinch of salt is added to the container;

(4) One half teaspoon of margarine or butter is added to the container;

(5) The container is positioned under the cover assembly and sealingly engaged in place;

(6) The apparatus is actuated to cook the mixture.

Instead of adding the additional ingredients to the egg batch before cooking, the ingredients may be added during cooking through the injection tube. For example, flavor or coloring additives in either gaseous or finely dispersed particulate form could be injected along with the pressurized air into the egg mixture. Alternatively, liquids, such as milk and liquid butter could be injected along with the air and/or steam or through separate orifices in the injection tube or via a second injection tube.

It has been found that the scrambled eggs are best produced when the cup is preheated. To this end, it is preferred that the empty container 26 first be positioned under the cover assembly 28 and sealingly engaged in place and that the machine 10 be actuated to execute a cook cycle wherein the steam and air is injected into the container 26 as if scrambled eggs were being cooked. The hot steam preheats or warms the container 26. The use of the warmed or preheated cup, when used next to receive a batch of cool, shelled eggs to be cooked, provides a good scrambled egg product. Since the whole cooking cycle takes only 8 seconds, the preheating step is not objectionable. However, if it were desired to be able to cook a batch of eggs without having to execute the 8 second preheating step, it would be possible to have one or more containers 26 continuously exposed to a separate preheating device and ready for use. Such a device might use infrared heat lamps or electric heating elements inserted into the interior of the containers.

If a number of batches of eggs are cooked in relatively rapid succession in one container 26, the container may be hot enough after each batch that it need not be preheated.

It is seen that thoroughly and uniformly cooked scrambled eggs can be produced very rapidly and without operator attention during the cooking process with the method and apparatus of the present invention. The scrambled eggs are cooked more rapidly and in less time than can be achieved with the current frying pan or grill methods and even faster than can be done by microwave. It has been found that if a batch of eggs is cooked for 8 seconds in accordance with the method of the present invention as described above, the scrambled eggs can be "recooked" under the same 8 second cycle with no noticeable burning.

The method of the present invention allows a certain "gourmet" treatment in the cooking of scrambled eggs because it is possible to add additional ingredients to the scrambled egg mixture before or during cooking and, owing to the thorough agitation of the steam and/or air injection, achieve a highly mixed product which has good ingredient dispersion throughout. Further, since the scrambled eggs can be cooked without being in contact with a hot frying pan or other griddle-type surface, the scrambled eggs are cooked without any surface burning and are cooked substantially uniformly throughout their entire mass.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. The method of cooking of scrambled eggs in a containerized batch comprising the steps of:
   A. charging a container with uncooked, shelled eggs with the yolks unmixed;
   B. without separately stirring said eggs, introducing a plurality of jets of steam at spaced, stationary locations in the interior of said eggs for a single, uninterrupted period to disperse said steam therethroughout whereby said eggs are agitated and cooked;
   C. simultaneously with step B, continuously venting said container to allow escape of steam from said container to maintain the interior volume of said container at substantially atmospheric pressure; and then
   D. terminating step B after said eggs are thoroughly and uniformly cooked to a substantially homogenous scrambled egg mass having an expanded volume and which is light and tender and delectable in appearance and flavor.

2. The method in accordance with claim 1 in which said container has a concave solid bottom wall portion and an upstanding sidewall portion and in which step B further comprises directing at least some of said jets through said eggs toward said bottom portion and reflecting some of said jets back through said eggs to maximize the agitation and cooking.

3. The method in accordance with claim 1 in which step A comprises the further step of providing a free head space for expansion of said eggs and in which step C further comprises venting said steam from said container through said free head space.

4. The method in accordance with claim 1 in which step A further comprises providing a vent passage above said container and communicating therewith above said eggs and in which step C further comprises allowing escape of steam from said container through said vent passage.

5. The method in accordance with claim 1 in which step A comprises the further steps of:
   (a) providing a free head space for expansion of said eggs, and
   (b) providing a baffle plate in said free head space above said eggs to inhibit spattering of said eggs outwardly away from the upper surface of said eggs.

6. The method in accordance with claim 5 in which said baffle plate is a substantially flat disc and in which step B further comprises locating said baffle plate generally parallel to, and displaced from, the upper surface of said eggs in said container.

7. The method in accordance with claim 1 in which the jets of steam in step B are provided by a steam supply conduit having a plurality of steam jet orifices.

8. The method in accordance with claim 1 in which step A further comprises charging said container with a mixture comprising 1 to 8 uncooked shelled eggs, and flavoring amounts of cream, salt, and butter.

9. The method of cooking scrambled eggs in a containerized batch comprising the steps of:
   A. charging a container with uncooked shelled eggs; and then
   B. providing gaseous jets selected from the group of two arrays of gaseous jets consisting of a plurality of jets of steam combined with at least one other gas and a plurality of separate jets of steam and separate jets of at least one other gas, said array of gaseous jets being introduced at spaced, stationary locations in the interior of said eggs to disperse and said steam and said other gas therethroughout, whereby said eggs are agitated and heated for a time period sufficient to produce a thoroughly and uniformly cooked, substantially homogenous scrambled egg mass having an expanded volume and which is light and tender and delectable in appearance and flavor.

10. The method in accordance with claim 9 in which said other gas is an inert gas or air.

11. The method in accordance with claim 9 in which said container has a concave solid bottom portion and an upstanding solid sidewall portion and step B further comprises directing at least some of said jets through said eggs toward said bottom portion and reflecting some of said jets back through said eggs to maximize the agitation and cooking.

12. The method in accordance with claim 9 in which step B further comprises introducing jets of saturated steam continuously for a first period of time sufficient to cook said eggs and in which step B further includes introducing jets of said other gas for a second period of time shorter than said first period of time and during said first period of steam introduction and then terminating the introduction of said other gas at the end of said second period before the termination of the introduction of said jets of steam at the end of said first period.

13. The method in accordance with claim 9 in which step B further comprises introducing (a) at least two other gases with said steam or (b) finely dispersed comestible particles carried in said other gas.

14. The method in accordance with claim 9 in which said other gas is one of nitrogen, carbon dioxide, and air.

15. The method in accordance with claim 9 in which said other gas is air.

16. The method in accordance with claim 15 in which step B further comprises introducing said air from a constant pressure source at between about 5 and 15 pounds per square inch gauge.

17. The method in accordance with claim 15 in which step B further comprises injecting said steam for a period of about 8 seconds and injecting said air for a period of about 5 seconds commencing with the injection of said steam.

18. The method in accordance with claim 9 in which said eggs comprise 1 to 8 eggs and in which step B further comprises introducing said steam into said eggs for a period of between 6 to 12 seconds at about 12 pounds per square inch gauge at saturation temperature and at a substantially constant flow rate corresponding to about 2 ounces of water by weight over the duration of the steam introduction period.

19. The method in accordance with claim 18 in which step B further comprises introducing air into said eggs for a period of between 3 to 7 seconds at a substantially constant flow rate equivalent to between 0.134 and 0.669 cubic feet of air measured at standard temperature and pressure over the duration of the air introduction period.

20. The method of cooking of scrambled eggs in a containerized batch comprising the steps of:
   A. charging a container with uncooked, shelled eggs with the yokes unmixed; and then B. introducing a plurality of jets of steam at spaced, stationary locations in the interior of said eggs continuously during cooking from a constant pressure source at between 5 and 15 pounds per square inch gauge to disperse said steam therethrough whereby said eggs are agitated and heated to produce a thoroughly and uniformly cooked, substantially homogenous scrambled egg mass.

21. The method in accordance with claim 20 in which step B further comprises introducing saturated steam.

22. The method in accordance with claim 20 in which step B further comprises introducing steam for a time interval of about 8 seconds.

23. The method in accordance with claim 20 in which step B further comprises introducing steam at least until the eggs are cooked to a temperature of between about 190° and about 200° F.

24. The method of cooking of scrambled eggs in a containerized batch comprising the steps of:
    A. charging a container with uncooked, shelled eggs;
    B. introducing jets of steam into said eggs for a single, uninterrupted period from a plurality of orifices arranged in an array of rows and columns spaced about a generally cylindrical surface, said jets radiating outwardly from a common axis whereby the steam is dispersed throughout said eggs to agitate and cook the eggs;
    C. simultaneously with step B, continuously venting said container to allow escape of steam from said container to maintain the interior volume of said container at substantially atmospheric pressure; and then
    D. terminating step B after said eggs are thoroughly and uniformly cooked to a substantially homogenous scrambled egg mass having an expanded volume and which is light and tender and delectable in appearance and flavor.

25. The method in accordance with claim 24 in which at least some of said orifices are circular and in which step B further comprises discharging each jet of steam in a generally conical flow stream from a separate orifice.

26. The method of cooking of scrambled eggs in a containerized batch comprising the steps of:
    A. charging a generally cup-shaped container with uncooked, shelled eggs;
    B. providing a generally cylindrical steam conduit having a plurality of steam jet orifices and positioning said container and conduit to locate said conduit generally coaxially with a vertical center line of the container and with said orifices within said uncooked, shelled eggs;
    C. sealing said container from the ambient atmosphere;
    D. introducing a plurality of jets of steam from said orifices at spaced, stationary locations in the interior of said eggs radiating generally outwardly from said conduit to disperse said steam therethroughout whereby said eggs are agitated and cooked;
    E. simultaneously with step D, continuously venting said container to a condenser to allow escape of steam from said container to maintain the interior volume of said container at substantially atmospheric pressure; and then
    F. terminating step D after said eggs are thoroughly and uniformly cooked to a substantially homogenous scrambled egg mass having an expanded volume and which is light and tender and delectable in appearance and flavor.

27. The method in accordance with claim 26 in which said generally cylindrical conduit has an end wall closure defining orifices therein, in which said container has a curved bottom, and in which step B further comprises locating said conduit with said orifices in said end wall closure at between 0.06 inches and 1.0 inches above the portion of said curved bottom of said container which lies directly below said orifices as measured along lines passing through the orifices parallel to the longitudinal axis of said conduit.

* * * * *